United States Patent [19]

Sagl

[11] Patent Number: 4,625,210

[45] Date of Patent: Nov. 25, 1986

[54] CONSTRUCTION FOR A PORTABLE RADAR DETECTOR HAVING A MIRROR

[75] Inventor: Rudolf J. C. Sagl, Rockwood, Canada

[73] Assignee: B.E.L-Tronics Limited, Mississauga, Canada

[21] Appl. No.: 612,090

[22] Filed: May 21, 1984

[30] Foreign Application Priority Data

Mar. 27, 1984 [CA] Canada .................................. 450633

[51] Int. Cl.⁴ ................................................ G02B 7/18

[52] U.S. Cl. ........................................ 342/20; 350/631

[58] Field of Search ........................ D10/46; D12/188; 350/631, 603, 606; 343/18 E

[56] References Cited

U.S. PATENT DOCUMENTS

| | | | |
|---|---|---|---|
| 3,099,797 | 7/1963 | Piccinini | 350/631 X |
| 3,843,236 | 10/1974 | Kurz, Jr. | 350/606 |
| 4,315,261 | 2/1982 | Mosher | 343/18 E |

FOREIGN PATENT DOCUMENTS

| | | | |
|---|---|---|---|
| 0244778 | 1/1966 | Austria | 350/606 |
| 0157254 | 7/1978 | Netherlands | 350/606 |

*Primary Examiner*—Thomas H. Tarcza
*Assistant Examiner*—Mark Hellner
*Attorney, Agent, or Firm*—Donald E. Hewson

[57] ABSTRACT

A radar detector assembly is provided for portable installation in an automotive vehicle—that is, for detachable attachment within the vehicle—where a substantial portion of the front face of the body of the radar detector is covered with a mirror, and the back face is provided with fastening means to detachably attach the radar detector to the mirror which is permanently installed in the vehicle. Within the body of the radar detector is a microstrip antenna for reception of microwave frequency radar signals, and the microstrip antenna is located within the body of the radar detector at a place where the front face of the body is not covered by the mirror, and the back face of the body is not proximate to the vehicle mirror. Thus, a radar detector that also functions as a full rearview mirror for an automotive vehicle is provided, having unobstructed front and rear exposure to microwave frequency radar transmissions, but having the other circuit components and elements of the radar detector being substantially shielded from microwave and intermediate frequency transmissions by the mirror on the major portion of the front face of the detector assembly and also by the vehicle mirror to which the detector assembly is detachably attached.

8 Claims, 4 Drawing Figures

CONSTRUCTION FOR A PORTABLE RADAR DETECTOR HAVING A MIRROR

FIELD OF THE INVENTION

This invention relates to radar detectors, particularly those that are used for detectng police radar of the sort used in radar speed traps on public roads. More particularly, the present invention relates to the assembly of a radar detector that also functions as a rearview mirror for the driver of the vehicle, by being detachably attached to the mirror which is permanently installed in the vehicle, and which provides substantially unobstructed exposure for a microstrip antenna within the body to microwave frequency radar transmissions while at the same time substantially shielding the circuit components of the radar detector from both microwave and intermediate frequency signals.

BACKGROUND OF THE INVENTION

Radar detectors for automotive vehicles have generally comprised three or four typical kinds of assembly. Very often, the radar detector comprises a horn antenna within the same body as the signal handling and alarm circuits, for mounting permanently into a vehicle such as by attachment to the bezel over the windshield, or perhaps by mounting onto the dashboard of the vehicle. Such radar detectors are the sort that have been marketed by a number of manufacturers under such names as FUZZBUSTER (TM), ESCORT (TM), and by the assignee of the present invention as its MICRO EYE (TM) Model 834. In any event, the bulkiness of the radar detector may be a hindrance to vision, or it may be otherwise undesirable from an esthetic point of view—particularly in luxury automobiles.

Thus, manufacturers including paticularly the Assignee of the present invention have provided remote models, where the antenna is mounted within the engine compartment of the vehicle, for example, with an annunciator mounted within the vehicle. An example of such structure is that which is manufactured and sold by the Assignee of the present invention as its MICRO EYE (TM) Model 837.

Neither of the above styles of radar detector assembly have in any way been portable from vehicle to vehicle, such as by an individual who owns more than one automobile, or a truck operator or driver who may wish to utilize his own radar detector in whatever vehicle he may be driving at the time.

A third kind of general assembly has therefore been provided, which has to a great extent been reasonably portable, and that is the kind that has been marketed by the Assignee of the present invention in association with its trade mark HOTSHOT, or as its SELECTRA (TM) Model 841. However, each of those models relied upon its mounting within an automotive vehicle for maximum sensitivity. Since each is generally intended for attachment to a windshield visor, the sensitivity is greatest when the visor is placed in a substantially vertical position for exposure of the radar detector to microwave frequency signals entering the vehicle from the front or the rear of the vehicle, through the vehicle glass and into the passenger compartment thereof. That, however, may again result in decreased visibility in certain circumstances.

The general assembly of radar detectors as spoken of immediately above has been such, however, that those radar detectors employed a microstrip antenna, and thus were relatively flat or thin in a front-to-back dimension. Because those radar detectors did not employ a horn antenna, their physical size could be made smaller; and they functioned with their circuits being substantially mounted vertically—in the same plan as the micro strip antenna—rather than being mounted horizontally behind a horn whose mouth was mounted vertically. Those microstrip radar detectors are, as noted, more portable from vehicle to vehicle, but may work with somewhat less sensitivity unless they can be substantially mounted vertically, and perpendicular to the longitudinal axis of the vehicle, for maximum exposure to horizontally directed microwave frequency radar transmissions.

The general frequencies at which mircowave radar transmissions occur, especially from police radar, are at the X-band (10.525 GHz) and K-band (24.150 GHz). Transmissions at those frequencies will pass through certain kinds of materials that are substantially transparent to them, such as glass and most plastics, but not other kinds of materials—especially metal or metallized surfaces. That is, microwave frequency transmissions will pass through the glass of an automotive vehicle, such as the windshield and side windows, such transmissions will pass through many plastics materials such as those that the cases may be molded from; but they will not pass through the metal of which the vehicle is constructed, neither will they pass through a metallized surface such as the silvering that is provided for rearview mirrors within the vehicle.

It is those latter characteristics that are particularly taken advantage of by the present invention; but moreover, the present invention has achieved one further desideratum that has been demanded by the marketplace and which is accommodated hereby, and that is for a portable radar detector that may be moved from one vehicle to another and that has maximum exposure and thereby maximum sensitivity to radar transmissions, while at the same time being both esthetically mounted within the vehicle and mounted in such a manner as to substantially not increase any vision obstruction particularly for the driver of the vehicle.

The inventor has discovered that, if a radar detector assembly is provided that substantially duplicates the rearview mirror that is always mounted in a vehicle, but at the same time the construction of the radar assembly is such that a microstrip antenna installed within the body of the radar detector is mounted so as to be neither forward nor rearward of either the mirror on the radar detector assembly or the mirror that is permanently installed within the vehicle, so as thereby to be not shielded by either mirror. Because of the mounting position of the vehicle mirror within the vehicle, usually at least somewhat below the top of the vehicle windshield, there is substantially unobstructed exposure of the radar detector assembly at least to radar transmissions entering the vehicle from the front thereof; and in most instances, also to radar transmissions that enter the vehicle from the rear thereof. [It is recognized that, for the most part, meaningful detection and alarm conditions upon exposure to police radar occur when the police radar is physically located either forward of the vehicle—i.e., down the road—or rearward of the vehicle—as in a following police vehicle equipped with a radar transmitter.]

It is also, of course, recognized that the permanently installed mirror in an automotive vehicle is substantially mounted vertically—that is, with its major plane vertical. Thus, by providing a radar detector construction and assembly such that the body of the radar detector may be detachably attached to the mirror that is permanently installed within the vehicle, and that has a mirror on its front face—i.e., facing the rear of the vehicle, the rear face of the radar detector assembly facing the front of the vehicle—then the previous rear view function continues to be served, while at the same time exposing the assembly to radar transmissions. Morever, the structure of the radar detector of the present invention can be modified so that the microstrip antenna may be mounted substantially vertically and substantially perpendicular to the longitudinal axis of the vehicle, while at the same time the mirror on the radar detector may be adjusted so as to provide the maximum and best visibility to any driver in the vehicle, without otherwise affecting or adjusting the vertical and perpendicular mounting of the microstrip antenna to the road surface and to the direction of travel of the vehicle, respectively.

It has always been a problem, however, that area of intruder radar devices that may be installed in buildings for protection and security of those buildings also work at the X and K band frequencies, so that they may also be detected by a radar detector and give a false alarm. Very sophisticated signal handling circuits have been developed by the Assignee of the present invention to discriminate against noise, and need not be discussed herein; but nonetheless especially with radar detectors that are equipped with a microstrip antenna, it is desirable that spurious microwave energy should be shielded against. More particularly, it is very desirable that energy at the intermediate frequency or frequencies of the signal handling circuits should be shielded against—those frequencies being in the 700 MHz to 5.0 GHz range, are also sufficiently high that they may intrude into the passenger compartment of an automotive vehicle—and the present invention provides such shielding by taking advantage of the substantial opaqueness of the vehicle mirror and the mirror which covers a substantial portion of the front face of the radar detector assembly, to both microwave and intermediate frequency transmissions. Thus, the construction of radar detector assemblies according to the present invention provides for the unobstructed exposure of the microstrip antenna to microwave radar frequency transmissions, and for substantially effective shielding of the radar detector signal handling circuits to both microwave and intermediate frequency signals, thereby so as to substantially reduce if not eliminate spurious alarm conditions due to the intrusion of microwave or intermediate frequency signals into the signal handling circuits of the radar detector.

BRIEF DESCRIPTION OF THE DRAWINGS

The specific construction of a radar detector according to the present invention, and other features and advantages thereof, are described in detail hereafter, in association with the accompanying drawings, in which.

DESCRIPTION OF THE PREFERRED EMBODIMENT

Figure 1:
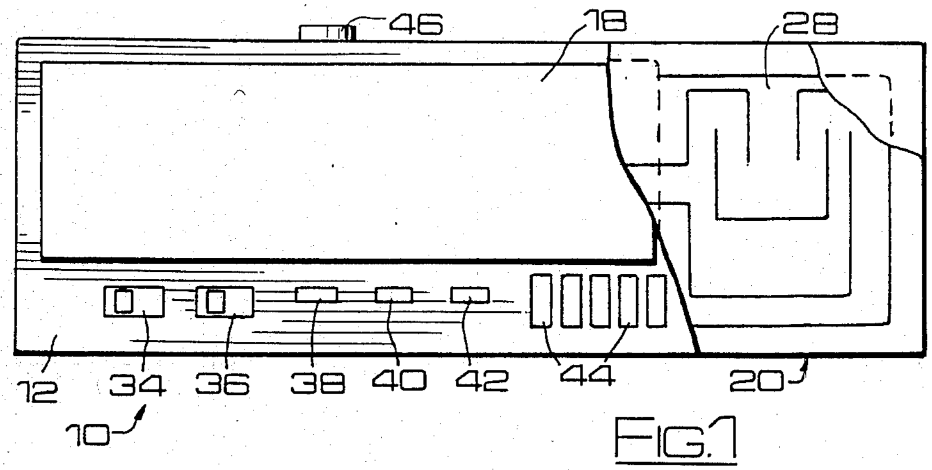
FIG. 1 is a front view, partially broken away, of a radar detector assembly according to the present invention.

As noted, the radar detector assembly 10 is particularly adapted for portable installation in an automotive vehicle—that is, it may be detachably attached to a permanently installed fixture in the vehicle, and in this case that fixture is intended to be the vehicle rearview mirror.

The radar detector assembly comprises a body that is generally designated at 12, having a front face 14 and a rear face 16. The front face 14 is covered over a substantial portion thereof by a mirror 18; and a minor portion of the front face, indicated at 20, is not covered by the mirror 18.

When it is mounted, the radar detector assembly 10 is arranged with fastener means shown generally at 22 and 24, and usually at least the fastener means 22 comprise a pair of spring-loaded clips. In any event, the fastening means 22 and 24 are provided and set to accommodate the mounting—that is, the detachable attachment—of the radar detector assembly 10 to the vehicle mirror 26, which is the rearview mirror that is permanently installed in the vehicle.

Figure 3:
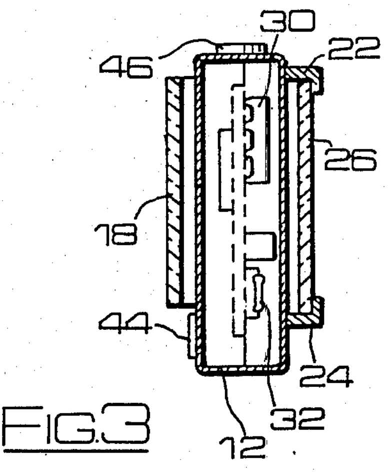
FIG. 3 is a section looking in the direction of arrows 3—3 in FIG. 2.

Within the body 12 of the radar detector assembly 10, there is a microstrip antenna shown generally at 28. The microstrip antenna 28 is mounted in the body 12 so as to be behind the portion 20 of the front face 14 of the body that is not covered by the mirror 18. On the other hand, as seen in FIG. 3, the other electrical circuit components of the radar detector and its signal handling circuits, such as a microchip 30, a resistor 32, and so on, are located within the body 12 so as to be substantially behind the mirror 18.

Because of the way that the radar detector assembly 10 is mounted to the vehicle mirror 26, that mirror 26 is positioned substantially behind—that is, forward in the sense of front-to-back of the vehicle itself—the other circuit components of the radar detector, except the microstrip antenna 28.

Thus, the microstrip antenna 28 is located within the body 12 in a positioned so that, when the radar detector assembly is mounted to the vehicle mirror 26, the microstrip antenna 28 is not obstructed either to the front or back by either mirror 18 or 26.

Of course, because of their very nature—usually silvered glass, but perhaps a translucent plastic material having a light reflective and metallized surface—the mirrors 18 and 26 are substantially opaque to both microwave and intermediate frequency transmissions. Therefore, by virtue of the assembly, and the manner that it is mounted to the vehicle mirror, the circuit components within the body except the micro strip antenna 28, are substantially shielded—at least from microwave and intermediate frequency transmissions from the forward or rearward directions. Because the vehicle in which the radar detector 10 is mounted is generally moving at some speed along a highway, and due also to sophisticated signal handling techniques that are beyond the scope of the present invention, any intrusion of microwave or intermediate frequency signals into the body 12 which may come directly from either side, will either be so quick or of sufficiently low level that the chances for spurious and false alarm conditions to occur are quite well eliminated by the present invention.

Of course, at the same time, the mounting of the radar detector assembly 10 to the vehicle mirror 26 provides an assembly whereby the mirror 18 then serves the purpose of the vehicle mirror 26, without any substantial increase in obstruction to vision of the driver.

Figure 2:
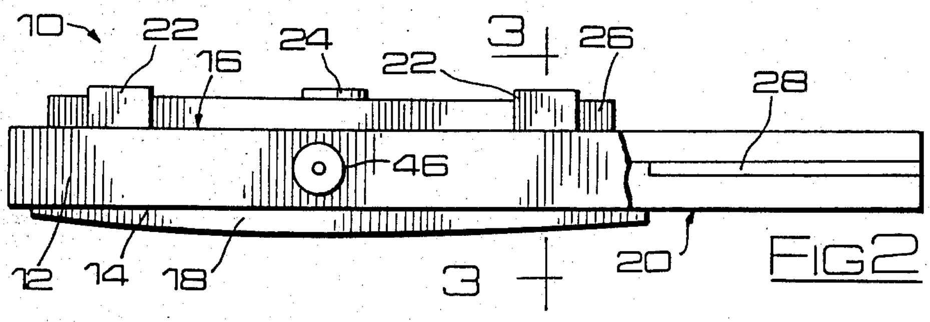
FIG. 2 is a top view of the radar detector assembly of claim 1, also broken away.

Indeed, to enhance the field of vision over which the driver may have some view in the mirror 18, it is convenient that the mirror be formed in a convex shape a shown in FIG. 2.

Figure 4:
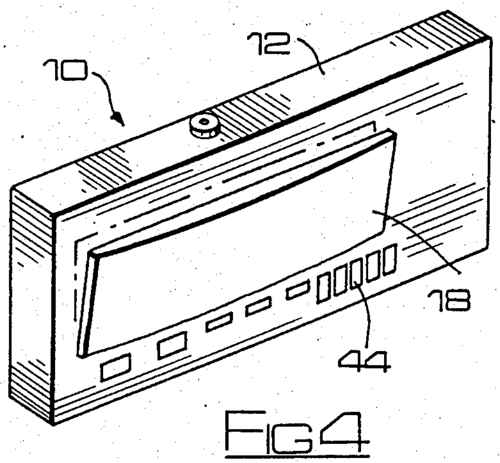
FIG. 4 is a smaller scale view of a radar detector assembly having an adjustable mirror independent of the body.

Moreover, as indicated in FIG. 4, the mirror 18 may be mounted to the body 12 in such a manner that it may be tilted with respect to the body, in an up-to-down manner or vice versa; and the mirror 18 may also be canted in a side-to-side manner. These additional adjustments may therefore permit the body 12 to be mounted in the vehicle so as to be substantially vertical and perpendicular to the front-to-back axis of the vehicle, while at the same time the mirror 18 may be adjusted for the best visibility of the driver—or, indeed, may be adjusted from driver to drive as may be convenient.

In the assembly of the radar detector 10, there may be a number of switches and indicators, such as an on/off switch 34 and a long range/local switch 36. Indicators such as on/off, continuing operating, and alarm, may be as shown at 38, 40, 42; and a plurality of indicators 44 may also be provided by which the strength of a detected radar signal may be indicated. A connection socket 46 is provided so that the radar detector may be connected to a source of electrical power within the vehicle—usually by the simple expedient of plugging an adaptor into the cigarette lighter of the vehicle and into the connection socket 46.

Conveniently, the body 12 of the radar detector assembly according to the present invention is formed of a plastics material. That is, conveniently the body 12 is injected moulded, usually in two parts, from a moldable thermoplastic material such as high impact polyethylene or polystyrene.

Clearly, the construction of the radar detector could be somewhat modified, in that an X-band and a K-band antenna could be placed beside each other, either above or below the mirror 18 and likewise above or below the vehicle mirror 26. That, however, results in a radar detector assembly that is slightly higher than before, which may in turn result in a slightly obstructed vision through the windshield past the mirror, or possibly an obstruction of the top of the assembly with the inside surface of the rearwardly slanted windshield. Likewise, the connector socket 46 could be placed at either end, or along the bottom of the body 12; and indeed, the switches and indicators along the front of the body 12 may be placed in a different position, or eliminated, without affecting the purpose of the assembly and the invention—which is to provide unobstructed X and K band exposure of the microstrip antenna while providing X-band, K-band and intermediate frequency shielding due to the mirrors 18 and 26 of the other circuit components of the radar detector.

These and other features and advantages of the invention may, of course, be modified or substituted beyond what is described above, without departing from the spirit and scope of the appended claims.

What is claimed is:

1. A radar detector assembly for portable installation in an automotive vehicle, having a body with a front face and a back face, and a first mirror on a substantial portion of the front face with a minor portion of the front face being not covered by a mirror;

said body having fastener means at the back face thereof for said body to be detachably attached to a mirror permanently installed in said automotive vehicle;

a microstrip antenna for said radar detector being within said body and behind said minor portion of said front face; and other electrical circuit components of said radar detector being within said body and behind said first mirror on said substantial portion of said front face;

said fastener means being arranged so that when said body is detachably attached to said vehicle mirror, said other electrical circuit components of said radar detector are forward of said vehicle mirror, and said microstrip antenna is positioned so as not to be forward of said vehicle mirror;

said vehicle mirror and said first mirror on said front face of said radar detector body being each substantially opaque to microwave and intermediate frequency transmissions;

and said body at said minor portion of said front face and at the rear face behind said minor portion being substantially transparent to microwave frequency transmissions;

whereby said microstrip antenna has substantially unobstructed front and rear exposure to microwave frequency transmissions, and said other electrical circuit components are substantially shielded to microwave and intermediate frequency signals at the front and rear by said first mirror on said front face of said radar detector body and by said vehicle mirror.

2. The radar detector assembly of claim 1, where said microwave frequency transmissions at which said minor body portion of said front face and at the rear face behind said minor portion are substantially transparent are at the X-band and the Y-band frequencies (10.525 GHz and 24.150 GHz).

3. The radar detector assembly of claim 2, where the intermediate frequency transmissions to which said mirrors are substantially opaque are in the range of 700 MHz to 5.0 GHz.

4. The radar detector assembly of claim 1, where said detector is adapted to be connected to an external source of electrical power.

5. The radar detector assembly of claim 1, where said first mirror is convex.

6. The radar detector assembly of claim 1, where said mirror is adjustable independently of said radar detector body.

7. The radar detector assembly of claim 1, where the material of said body is a moldable thermoplastic material.

8. The radar detector assembly of claim 1, where said first mirror is a translucent plastic material having a light reflective and metallized surface.

* * * * *